UNITED STATES PATENT OFFICE.

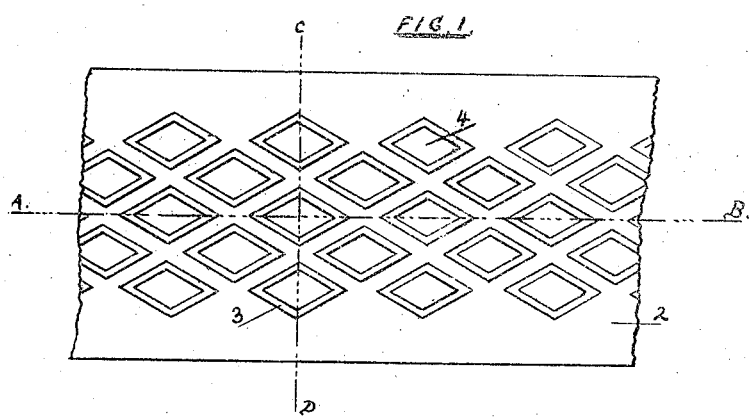
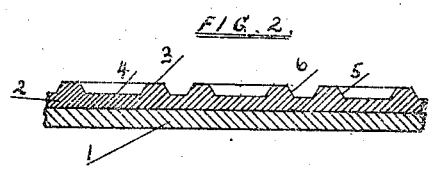
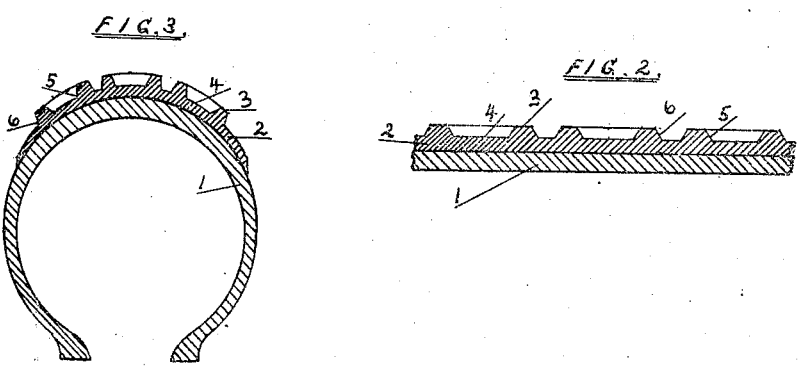

FRANK G. SCHENUIT, OF BALTIMORE, MARYLAND.

TIRE-TREAD.

1,377,283. Specification of Letters Patent. Patented May 10, 1921.

Application filed November 4, 1920. Serial No. 421,628.

*To all whom it may concern:*

Be it known that I, FRANK G. SCHENUIT, a citizen of the United States, residing at Baltimore city, in the State of Maryland, have invented a certain new and useful Improvement in Tire-Treads, of which the following is a specification.

My invention relates to tire treads, especially of the non-skid type for motor vehicles and has for its object the providing of a diamond shaped vacuum tread to facilitate ease in making and breaking the suction as the tire operates.

A further object of my invention is the arranging of a plural number of diamond shaped vacuum elements to mutually act in preventing skidding on smooth surfaces.

A further object of my invention is the providing a tire tread with diamond shaped vacuum elements, the longest element of the diamond being in the plane of operation of the tire to facilitate the making and breaking of the suction as the tire revolves.

A further object of my invention is the providing on the circular surface of the tread of the tire both transversely and longitudinally diamond shaped vacuum elements.

With the foregoing and other objects in view, my invention consists of the novel construction, combination and arrangement of parts as hereinafter specifically described and illustrated in the accompanying drawing, wherein is shown the preferred embodiment of my invention, but it is understood that changes, variations and modifications can be resorted to which come within the scope of the claims hereunto appended.

In the drawing of the herein described embodiment of my invention, Figure 1 is an expansion view of a section of the surface of a tire tread showing the diamond shaped vacuum elements arranged in diagonal transverse and longitudinal rows. Fig. 2 is a longitudinal sectional view taken through "AB" of Fig. 1 and Fig. 3 is a sectional view of a tire showing the tire tread as shown at "CD" in Fig. 1.

Similar numerals refer to similar parts throughout the several views.

1 is the fabric portion of a tire casing. 2 is the resilient wearing surface. 3 are the diamond shaped vacuum elements projecting from wearing surface 2 consisting of recessed portion 4 inside inclined walls 5 and outside inclined walls 6. The diamond shaped vacuum elements are arranged with their longest axis parallel with the plane of the tire, this insures the sharpest point first and last contacting with the ground, thereby functioning with the least resistance. It is preferable to have two or more of such elements in each transverse section of the tire to insure proper contact on curves and rough roads.

The operation of my invention is as follows:

On comparatively smooth surfaces a plurality of the diamond shaped cup elements approach the ground, are finally sealed through one of their longest points and are finally broken from their seal by the other of their longest points being raised from the surface, this avoids in a great measure the noise incident to the use of vacuum cups.

The diamond shape in aggregate combination forms a highly non-skidding tire especially when arranged as shown in Fig. 1.

Having thus described my invention, what I claim and desire to secure by Letters Patent is—

1. A tire tread comprising a resilient surface in combination with outstanding independent diamond shaped vacuum elements secured to and projecting from said surface and arranged in diagonal transverse and longitudinal rows.

2. A tire tread comprising a resilient surface in combination with outstanding independent diamond shaped vacuum elements secured to and projecting from said surface, said elements being provided with vacuum depressions within said diamonds having inclined walls and arranged in diagonal transverse and longitudinal rows.

3. A tire tread comprising a resilient surface in combination with a plurality of independent outstanding diamond shaped vacuum elements secured to and projecting from said surface, said elements being provided with vacuum depressions within said diamonds, said surface being provided with said diamond elements at various parts thereof in different longitudinal planes of operation.

FRANK G. SCHENUIT

Witnesses:
J. LE ROY HOPKINS,
WILLIAM W. VARNEY.